No. 637,643. Patented Nov. 21, 1899.
F. E. MORRISON.
COVER FOR COOKING VESSELS.
(Application filed Jan. 26, 1899.)
(No Model.)

Witnesses
Floyd E. Morrison, Inventor.
By his Attorneys.

THE NORRIS PETERS CO., PHOTO-LITHO., WASHINGTON, D. C.

UNITED STATES PATENT OFFICE.

FLOYD E. MORRISON, OF ELK LICK, PENNSYLVANIA.

COVER FOR COOKING VESSELS.

SPECIFICATION forming part of Letters Patent No. 637,643, dated November 21, 1899.

Application filed January 26, 1899. Serial No. 703,470. (No model.)

*To all whom it may concern:*

Be it known that I, FLOYD E. MORRISON, a citizen of the United States, residing at Elk Lick, in the county of Somerset and State of Pennsylvania, have invented a new and useful Cover for Cooking Vessels, of which the following is a specification.

My invention relates to improvements in covers for cooking pots and vessels; and one object thereof is to provide an improved appliance for firmly locking the cover in place on the vessel to which it may be applied, such fastening appliance being readily adjustable into engagement with the vessel and easily manipulated without the hands touching the vessel or the cover to release the fastener from the vessel and permit the removal of the cover.

A further object is to provide an improved cover adapted to permit liquid to be drained from the vessel without escape of the solid matter or food contained therein, and the ports by which the draining of the liquid is effected may be readily closed to retain steam within the vessel for the purpose of expeditiously cooking the food.

With these ends in view the invention consists in the novel construction and arrangement of parts, which will be hereinafter fully described and claimed.

To enable others to understand the invention, it is illustrated in the accompanying drawings, forming a part hereof, and in which—

Figure 1:
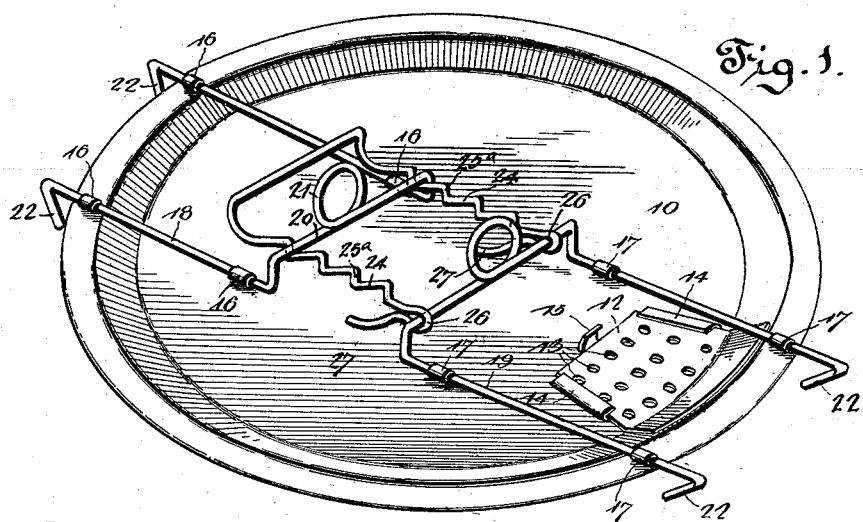
Figure 2:
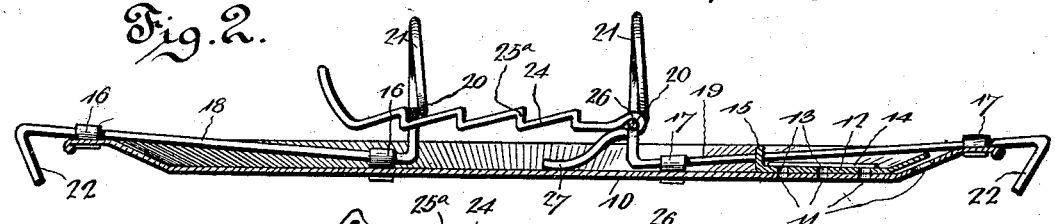
Figure 3:
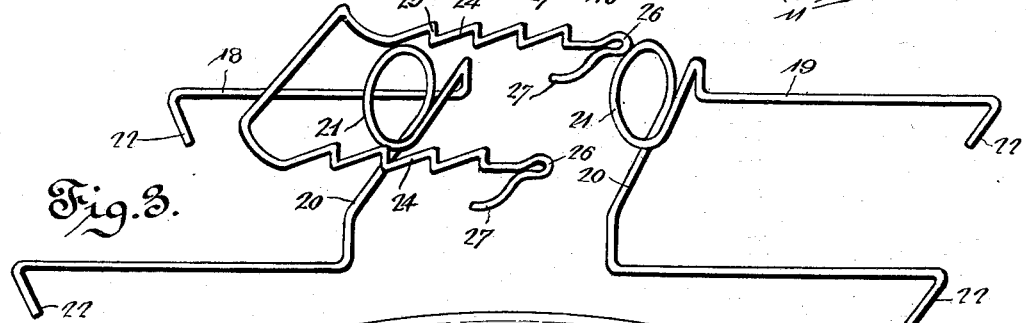
Figure 4:
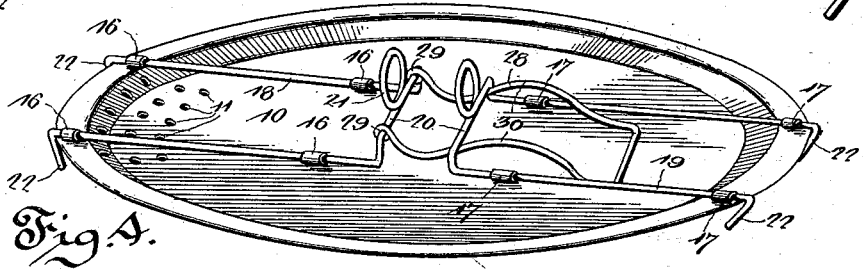

Figure 1 is a perspective view of a cover with my improved fastener applied thereto. Fig. 2 is a longitudinal sectional elevation taken on a plane centrally through the fastener appliance. Fig. 3 is a detail perspective view of the fastener and the locking contrivance therefor, showing the parts separated one from the other. Fig. 4 is a perspective view of the cover, illustrating another style of locking device for the fastener-bail.

Like numerals of reference denote like and corresponding parts in each of the several figures of the drawings.

The cover 10 of my improvement is stamped or struck up in a single piece of sheet metal in substantially the disk form represented in the drawings, and this cover is of a diameter proper to fit upon the edge of an ordinary cooking pot or vessel. This sheet-metal cover is provided with a plurality of drain-ports arranged in multiple series, as indicated at 11, and said ports are adapted to be opened and closed by an adjustable valve-plate 12. This valve-plate has a plurality of openings 13 arranged therein similarly to the ports 11 in the cover, and said valve-plate is slidably confined on the cover in suitable guideways 14, whereby the plate may be adjusted to bring its openings coincidently with the ports of the cover, or it may be moved for the openings 13 therein to lie opposite imperforate portions of the cover, so as to close the ports 11. This valve-plate is provided with a handle 15 for its convenient manipulation, and the adjustment of the valve-plate to a position where its openings register with the ports of the cover permits steam to escape from the cooking vessel and allows the vessel to be tilted or turned upon one side for the purpose of draining water and liquids from the vessel without escape of the solid contents or food in said vessel.

The cover constructed as herein indicated is especially serviceable when it is desired to drain liquid from the food in the cooking vessel, and to prevent separation of the cover from the vessel when the latter is tilted I provide a novel fastening appliance by which the cover is clamped firmly upon the vessel, such fastening appliance being readily manipulated to attach the cover to the vessel or remove it therefrom without putting the operator to the inconvenience of touching either the cover or the vessel.

For the attachment of the fastener to the cover two sets of guides 16 17 are provided on the cover. These guides are arranged to receive the respective members or bails of the fastener, and each guide may consist of a loop, clip, or lips attached to the cover or made integral therewith.

The fastener proper consists of a pair of bails 18 19, and one bail is fitted in the set of guides 16 to have its catch-hooks project from one edge of the cover, while the other fastener-bail is fitted in the guide 17, for its catch-hooks extend beyond the opposite edge of the cover, whereby the fastener-bails are disposed on the cover for the catch-hooks thereof to engage with the vessel at diametrically opposite sides of the latter. Each member or bail is bent, preferably, from a single piece of wire to form a cross-bar 20, which is provided with a finger-piece 21 in the form of a loop or eye, and the side bars of this bail have their opposite free ends bent at right angles to form the catch-hooks 22, the latter adapted to engage either with the side of a cooking vessel or to fit beneath an outwardly-turned lip at the mouth of said vessel. The bails of the fastener are adapted to be moved in opposite directions across the cover when the hooks thereof are to be released from engagement with the vessel; but by drawing the bails inwardly toward each other the catch-hooks engage with the sides or lip of the cooking vessel, as will be readily understood.

To hold the fastener-bails securely in place when engaged with a vessel and to provide for the use of the cover on vessels which may vary in diameter within certain limits, I provide a locking device which is connected with one fastener-bail and has interlocking engagement with the other fastener-bail, said locking device being itself yieldable or resilient to remain in engagement with that member or bail of the fastener with which it is adjustably connected. In Figs. 1 to 3, inclusive, of the drawings this locking device is represented as embodied in a spring-bail 23, which is bent from a single piece of wire to form the side bars 24, the loops or eyes 26, and the spring-arms 27. In the operation of bending the wire to form the elastic locking-bail the side bars thereof are formed with angular bends 25$^a$ to produce a series of ratchet-teeth, and these teeth of the two side bars of said bail are arranged to register, so that a cross-bar 20 of one fastener-bail may properly engage with corresponding ratchet-teeth of the side bars of the locking-bail. In assembling the locking-bail operatively to the members or bails of the fastener the spring-arms 27 of the locking-bail are slipped around the cross-bar 20 of one of the fastener-bails—as, for instance, the bail 19. The spring-arms 27 of the locking-bail are arranged to press or bear against the cover 10, while the loops or eyes 26 of the locking-bail engage loosely with the cross-bar 20 of the fastener-bail 18, whereby the arms 20 exert spring action or tension against the ratcheted locking-bail to normally force the latter in an upward direction. The ratchet-bars of the locking-bail extend beneath the cross-bar 20 of the fastener-bail 19, and as the locking-bail is normally lifted by the action of the spring-arms 27 said locking-bail has its ratcheted bars forced or held into engagement with the fastener-bail 18. It is evident that the free ends of the locking-bail may be depressed sufficiently for the ratchet-teeth to clear the cross-bar of the fastener-bail 19, and one or both of the fastener-bails may be adjusted in order to separate said fastener-bails and release the catch-hooks thereof from the vessel. The locking-bail 25 slides with the fastener-bail 19 in its traveling adjustment, and the spring-arms 27 of said locking-bail slide across the top of the cover, so as to always exert the desired action on the locking-bail for holding the ratchet-bars of said locking-bail in engagement with the other fastener-bail 19.

In Fig. 4 of the drawings I have represented another embodiment of my invention, in which the cover and the fastener-bails are similar in construction to the devices shown by Figs. 1 to 3, inclusive; but said Fig. 4 represents a modified construction of the locking-bail, which is operatively connected to one fastener member and has yielding frictional contact with the other fastener member in order to hold the two members of the fastener in their adjusted positions. In this embodiment of the invention the locking-bail 28 is bent from a single piece of wire to provide loops or eyes 29, which are engaged loosely with the cross-bar of one fastener-bail 18, and the side bars of this locking-bail are curved to give the sinuous shape thereto, as at 30. The free end of the locking-bail 28 rests upon the cover 10, while the other end of said locking-bail is attached loosely to the fastener-bail 18 to travel therewith. The curved side bars of the locking-bail press or bear against the cross-bar of the fastener-bail 19, and this locking-bail is yieldable or elastic for the fastener-bail 19 to ride thereon, whereby the reaction of the elastic bail 28 exerts sufficient frictional pressure against the bail 19 to hold the latter in its adjusted position.

In the use of the fastener shown by Figs. 1 to 3, inclusive, the ratchet-like angular bends of the locking-bail allow the fastener-bails to be drawn inward freely when applying the cover to a vessel, because the inclined sides of the teeth will ride easily under the cross-bar of the fastener-bail 18; but outward movement of the fastener-bails in a direction to release the cover will be overcome by the bar 20 of the bail 18 engaging with the abrupt sides of the ratchet-teeth on the locking-bail.

Changes may be made in the form of some of the parts while their essential features are retained and the spirit of the invention embodied. Hence I do not desire to be limited to the precise form of all the parts as shown, reserving the right to vary therefrom.

What I claim is—

1. A cover-fastener consisting of duplicate adjustable fastener-slides, and a yieldable locking device connected with one fastener-slide to travel therewith and normally held under spring tension in adjustable engagement with the other fastener-slide said fastener being carried by and guided on the cover, substantially as described.

2. The combination with a cover and guides thereon, of fastener-bails slidably fitted in the guides of said cover and provided with means for engaging with a vessel, and an elastic locking-bail connected with one fastener-bail to travel therewith and having engagement with the cover to be pressed into normal engagement with the other fastener-bail, substantially as described.

3. The combination with a cover and guides thereon, of fastener-bails slidably fitted in the guides, and a ratcheted locking-bail loosely connected with one fastener-bail to travel therewith and having spring-arms which rest upon the cover and tend to normally hold the ratcheted locking-bail with engagement with the other fastener-bail, substantially as described.

4. The combination with a cover, of fastener-bails slidably connected to said cover and each provided at its inner end with a finger-hold and at its outer end with catches, and a ratchet-like locking-bail fitted beneath one of the fastener-bails and loosely connected with the other fastener-bail, said locking-bail having spring-arms which rest upon the cover and hold the ratcheted locking-bail in firm engagement with one fastener-bail, substantially as described.

In testimony that I claim the foregoing as my own I have hereto affixed my signature in the presence of two witnesses.

FLOYD E. MORRISON.

Witnesses:
CH. TAYLOR,
FRANK NAGRELS.